March 10, 1959 — R. A. HAMILTON — 2,876,673
PLUMBING MIRROR

Filed Oct. 8, 1956 — 3 Sheets-Sheet 1

INVENTOR.
RALPH A. HAMILTON
BY
Agent

March 10, 1959 R. A. HAMILTON 2,876,673
PLUMBING MIRROR
Filed Oct. 8, 1956 3 Sheets-Sheet 2

INVENTOR.
RALPH A. HAMILTON
BY
George C. Sullivan
Agent

March 10, 1959  R. A. HAMILTON  2,876,673
PLUMBING MIRROR
Filed Oct. 8, 1956  3 Sheets-Sheet 3

INVENTOR.
RALPH A. HAMILTON
BY
George C. Sullivan
Agent

United States Patent Office 2,876,673
Patented Mar. 10, 1959

2,876,673

PLUMBING MIRROR

Ralph A. Hamilton, Glendale, Calif., assignor to Lockheed Aircraft Corporation, Burbank, Calif.

Application October 8, 1956, Serial No. 614,515

7 Claims. (Cl. 88—1)

This invention relates to optical devices and relates more particularly to plumbing mirrors for establishing or presenting truly horizontal optical reflecting surfaces.

One of the most time consuming operations in optical tooling procedures as practiced in the aircraft industry and elsewhere, is the initial establishment of the positions of lines of sight relative to a jig frame, or the like. Several methods have heretofore been devised for establishing one line of sight in a vertical position above a second line of sight including (a) the dropping of small diametered plumb bobwires in the lines of sight and (b) the use of surveying instruments to position the supports or cups that are to receive the telescopes, targets, etc. These, as well as the other methods heretofore employed, are very time consuming and therefore costly. Another shortcoming of the present day optical tooling procedures and equipment is the unavailability of adequate means for locating and holding the telescopes and targets to establish the lines of sight.

It is a general object of this invention to provide simple, practical and particularly effective plumbing mirrors suitable for use in optical tooling procedures and operable to at all times establish truly horizontal light reflecting surfaces.

Another object of the invention is to provide a plumbing mirror of this kind which incorporates a pool of mercury whose upper surface constitutes a truly horizontal optical reflecting surface and a unique means for damping out vibration and movement of the mercury while maintaining high precision and accuracy in the light reflecting and transmitting qualities of the instrument. The device or instrument includes an optically flat, transparent cover glass spaced above the light reflecting upper surface of the mercury pool, a layer or film of transparent liquid or oil covering the mercury pool to occupy the space between the surface of the mercury and the under side of the cover glass and which dampens the vibrations of the mercury and a second layer or film of oil of the same refractive index as the oil of the first layer, this upper or second layer of oil being on the upper side of the cover glass and serving to optically compensate for any "optical wedge" effect of the first or lower layer of oil produced by a minor out of level position of the mirror instrument. In other words, the film of transparent oil on the upper surface of the cover glass serves to refract the entering and reflected ray of light in a direction and to an extent to compensate for and therefore correct refraction of the light ray caused by the optical wedge effect of the oil layer on the surface of the mercury when the mirror instrument is not positioned precisely in a horizontal plane. This is of considerable practical importance since it is difficult to set and maintain the mirror instrument in a precisely horizontal plane and also avoids the expenditure of time that would otherwise be involved in attempting to obtain an accurate horizontal setting of the mirror instrument and prevents inaccuracies that might result from the wedge effect of the liquid or oil on the upper surface of the mercury.

A further object of the invention is to provide a mirror of this character that is small, self-contained, and designed to be readily and quickly installed or seated in an adjustable cup or base. The body or case of the mirror presents a parti-spherical under surface adapted to seat in the socket of a base or cup which, in turn, is designed to be conveniently adjusted on the jig bracket or the like. The mirror is merely removably seated in the cup for easy and convenient leveling in order to carry out the optical tooling functions and for immediate removal when it has served its purpose to permit the arrangement of a target or other device in the accurately set or positioned cup.

Other objectives and features of the invention will become apparent from the following detailed description of a typical preferred form and application, throughout which description reference will be made to the accompanying drawings in which.

Figure 1:
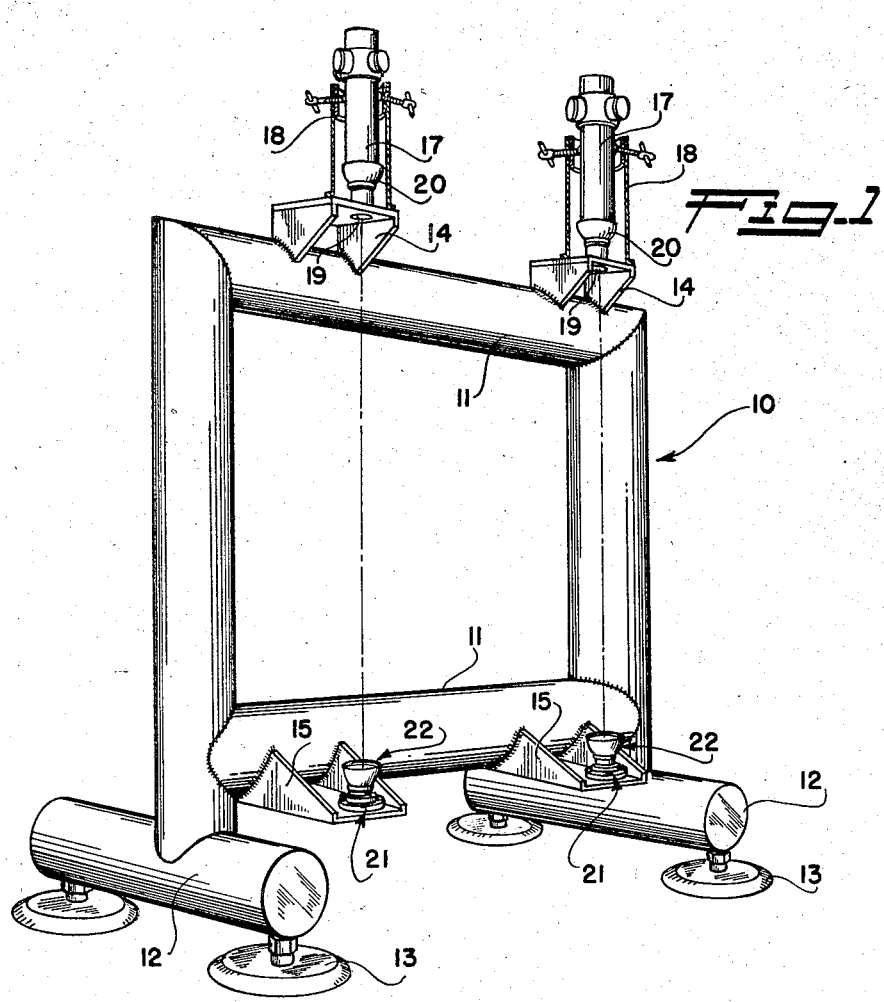
Figure 1 is a perspective view of an optical tooling jig showing two horizontal mirrors of the invention arranged therein for use in association with optical tooling telescopes.
Figure 2:
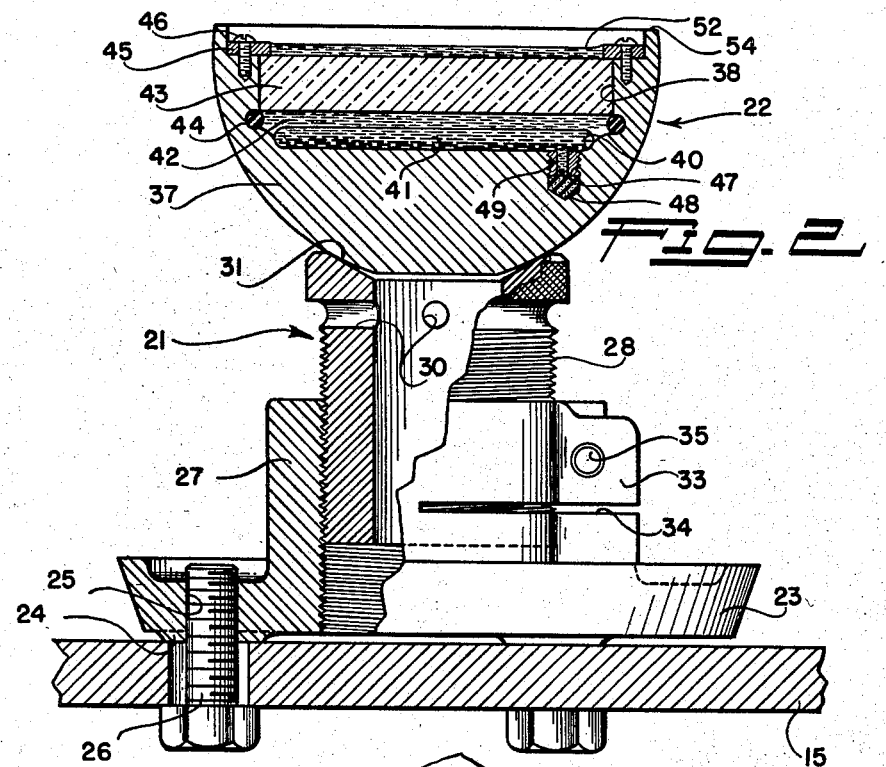
Figure 2 is an enlarged vertical sectional view of one of the mirrors arranged in its adjustable holder or cup with a portion of the latter appearing in side elevation.

The mirrors of the invention of course have many and varied uses or applications. They are especially suited for optical tooling operations and I will herein describe a typical embodiment of the invention employed for this purpose, it being understood this is merely a typical application and is not to be construed as limiting the invention. In Figure 1, I have shown a jig frame 10 having spaced upper and lower horizontal members 11. The frame 10 has two spaced base members 12, each provided with vertically adjustable feet or pads 13 useful in adjusting the attitude or position of the frame. The upper and lower horizontal members 11 carry protruding horizontal brackets 14 and 15 respectively, the upper brackets 14 being vertically aligned with the lower brackets 15. Auto-reflecting or auto-collimating telescopes 17 are supported on the brackets 14 by cups 20 and adjustable brackets 18. The brackets 14 have openings 19 in the lines of sight of the telescopes 17 so that the rays of light from the telescopes may be directed to and from the mirrors, targets, etc. on the lower brackets 15. The telescopes 17 and their brackets 18 are well known in the art and require no further description here. However, the mounts or cups 20, per se, for adjustably supporting the telescopes 17 may be identical with the cups 21 for supporting the mirrors 22 of the invention, and the cups 21 will be described below.

The horizontal plumbing mirrors 22 of the invention are adapted to be removably positioned in the cups 21 in vertical or coaxial alignment with their respective telescopes 17. Each cup 21 (and each cup 20) includes a base flange 23 having three equally spaced flat surfaced bosses 24 on its underside for resting on the bracket 15 or other support. Threaded bores 25 pass through the flange 23 and its bosses 24 to receive securing bolts or screws 26 which hold the cup 21 in position after accurate location of the same. A central vertical tubular body 27 rises from the flange 23 and is internally threaded to adjustably receive a stem 28. The stem 28 has one or more transverse openings or sockets 30 in its upper portion for receiving wrenches, or the like, to facilitate its vertical screw adjustment. The upper end of the stem 28, which is preferably tubular, has a downwardly and inwardly tapered or beveled annular surface 31. This surface 31, which is preferably accurately machined and finished, receives and supports the horizontal mirror 22. The tubular base or body 27 is split vertically at 32 and has lugs 33 at each side of the split. A horizontal split or cut 34 is also provided in the body 27 to intersect the split 32 and to pass through the lugs 33. A clamp screw 35 is operable to force or actuate the lugs 33 of the split body toward one another to clamp the tubular body about the stem 28 and thus fix or secure the stem in a selected or required adjusted position.

The plumbing mirrors of the invention each include a body 37 in the form of an approximate half sphere of steel or other suitable material. The partially spherical undersurface of the body 37 is preferably accurately ground and finished to rest or seat on the top annular surface 31 of the cup stem 28. It will be seen that this spherically curved surface of the mirror body 37 has annular line contact with the tapered surface 31 of the cup to permit precise or delicate position adjustment of the mirror on its cup 21. The upper end of the mirror body 37 which is flat and generally diametric, has a socket or bore 38 of considerable depth. The socket 38 is counterbored at its inner end to have what I will term a well 40 for containing a pool 41 of mercury. The side wall of this well 40 is preferably convexly curved downwardly and inwardly and the well is sufficiently deep to contain the mercury pool 41 and a body, layer or film 42 of an optically transparent liquid such as a transparent oil. A disc shaped cover glass 43 of good optical quality is set in the socket 38 to overlie and retain the oil 42 and mercury 41. In the preferred embodiment of the invention illustrated the upper and lower surfaces of the cover glass are flat and parallel. A seal ring 44 of neoprene or other sealing material, substantially unaffected by the oil and mercury, is set in the wall of the socket 38 to seal with the lower end or corner of the cover glass 43 to prevent the escape of the oil and mercury. The socket 38 is enlarged at its mouth to receive a hold-down ring 45 attached to the body 37 by screws 46 and engaging the upper margin of the cover glass 43 to secure the same in the socket.

The mercury pool 41 and oil layer 42 preferably completely occupy the well 40 and thus avoid the presence of air pockets and bubbles that might impair the operation of the mirror. The invention includes means to absorb expansion of the mercury pool 41 and oil layer 42 as a result of increases in temperature of the device. This means includes one or more holes 47 in the bottom of the well 40 which contain resilient cellular material 48, such as cellular "neoprene." The closed cells of the material 48 contain air or gas which expands and compresses during thermal expansion and contraction of the mercury pool 41 to prevent such expansion and contraction from placing undue strains on the cover glass 43. Tubular set screws 49 in the mouths of the openings 47 retain the material 48 in the holes.

Figure 3:
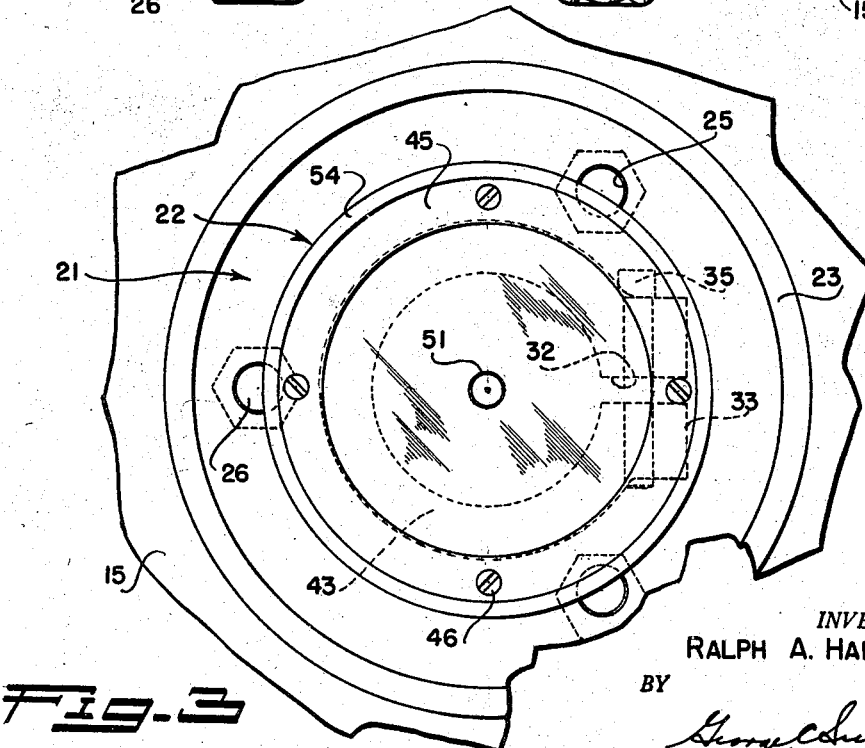
Figure 3 is an enlarged top or plan view of the mirror.
Figure 4:
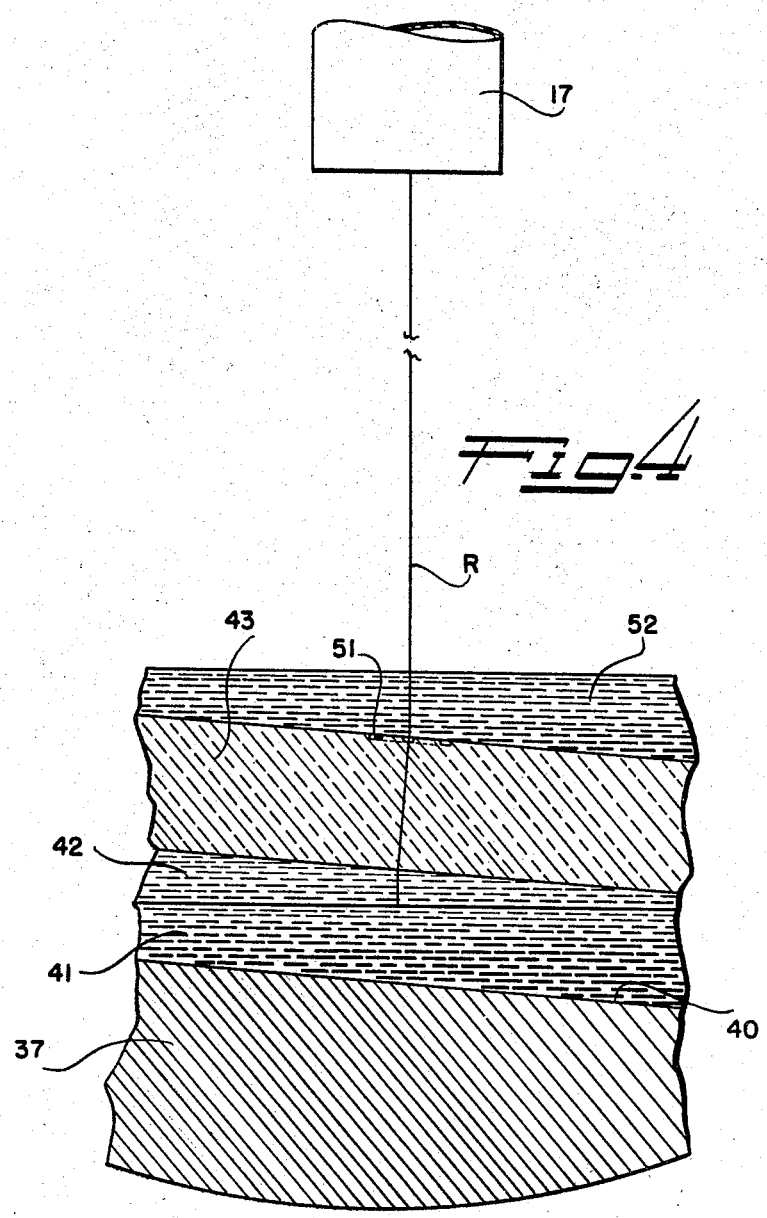
Figure 4 is an enlarged fragmentary diagrammatic view illustrating the refractive action of the layers or films of transparent liquid incorporated in the mirror.

An optical target 51 is provided on the upper surface of the cover glass 43. As seen in Figures 3 and 4, this target 51 may be of the circle and dot type and the target may be etched, abraided or photographed on the surface of the glass. The arrangement of parts and the construction are such that the target 51 is accurately centered in the hemi-spherical body 37.

The invention further includes a film or layer 52 of transparent liquid on the upper surface of the cover glass 43. The above described hold-down ring 45 may form a marginal dam for retaining the liquid layer 52. The layer 52 is preferably of the same liquid as the film or layer 42 to have the same light refracting characteristics however its vertical thickness is capable of substantial variation without affecting the operation of the instrument. In practice the liquid or oil of the layer 52 may be poured on the cover glass 43 when the mirror 22 is roughly or approximately initially positioned on its cup 21 or just prior thereto. With the construction as described there is a film or layer of transparent liquid on both surfaces of the cover glass 43, the liquid of the two layers being of the same refractive index. The upper surface of the upper liquid layer 52 remains horizontal at all times and is therefore parallel with the reflective surface of the mercury pool 41. The upper and lower surfaces of the cover glass 43 are flat and parallel (or concentric). The mirror assembly accordingly comprises a combination wherein the two liquid wedges 42 and 52 of identical refractive index at the opposite sides of the cover glass serve to mutually cancel our angular deviation of the light due to the refraction of the light ray passing through the interfaces of the liquid and glass surfaces when the instrument is tilted to any reasonable degree. It should be noted that the hold-down ring 45 and its retaining screws 46 are spaced below the flat upper surface 54 of the hemispherical body 37. This surface 54 is preferably accurately machined and finished to receive levels or the like for the initial approximate setting or leveling of the mirror in its cup 21.

In the use of a horizontal mirror of the invention the mirror is placed in its cup 21 after the related telescope 17 and the mirror supporting cup 21 have been roughly or approximately positioned by simple measurement procedures. The related telescope 17 is mounted in its cup 20 and arranged to be adjusted by the bracket 18, and the cup 21 for carrying the horizontal mirror 22 is merely placed on its bracket 15 and roughly positioned thereon by the aforementioned simple measurements. The cup 21 is not attached to its bracket 15 at this time. The horizontal mirror is brought to an approximately level condition by the use of a scale level, or the like, placed on the upper rim surface 54.

With the telescope 17 and the plumbing mirror 22 roughed in or approximately positioned as above described, the workman looks through the telescope 17 which auto-collimates. The natural characteristic of liquids is to seek a level so that the upper surface of the mercury pool 41 provides a horizontal plane of good reflective quality. The liquid or oil level 42 between the cover glass 43 serves to dampen out the vibrations of the mercury pool. This insures that the mercury pool remains sufficiently stable to provide or present an effective, usable, optical reflection. With the auto-collimating or auto-reflecting telescope 17 arranged in a vertical relation above the mirror 22 and with its light source energized, the ray of light from the telescope enters the upper horizontal surface of the transparent liquid layer 52, passes through this film without deviation and continues on through the cover glass 43 and transparent liquid level 42 to the reflective upper surface of the mercury pool 41 to be reflected back to the telescope. In the event the mirror 22 is not truly horizontal or level the ray of light entering the mirror passes through the upper surface of the liquid layer 52 which is horizontal, passes on through this layer without deviation or refraction and upon striking the cover glass 43 (which is tilted at an angle) is refracted by an amount equal to the difference in the refractive index of the liquid film and the refractive index of the cover glass. Upon passing from the cover glass 43 into the lower liquid layer 42 the ray of light is again refracted but in the opposite direction and in an amount equal to its refraction upon entering the cover glass 43, the two liquid layers 42 and 52 being of the same refractive index, so that the ray of light passing downwardly leaves the cover glass 43 in a path parallel to its entrance. This is illustrated in Figure 4 of the drawings where the inclination of the cover glass 43 and the bottom of the well 40 are exaggerated for the purpose of illustration and where the line R represents the ray of light from the auto-collimating telescope 17. The ray of light R is reflected back or upwardly by the upper surface of the mercury pool 41 which is, of course, horizontal and the light returns back to the telescope 17 following exactly the same path it took when traveling to the surface of the mercury pool. This is true however only in the event the telescope 17 is in a truly vertical position. Accordingly, any deviation of the telescope from a true vertical is immediately visually seen in the telescope as a misalignment or displacement of the auto-collimated image and the telescope may be adjusted to a truly vertical position.

In accurately locating the horizontal mirror 22 it is moved together with its cup 21 on the bracket 15 until the target 51 of the cover glass 43 is brought into coaxial relation with the cross-hairs, not shown, of the telescope whose focus has been changed to view the target 51. When this has been done the cup 21 is secured to the bracket 15 by the screws 26. Following such attachment of the mirror supporting cup the position of the mirror may be rechecked to make sure that the mirror target 51 remains coaxial with the cross-hair of the truly vertical auto-collimating telescope 17. When the cup 21 carrying the mirror has thus been accurately brought into coaxial relation with the previous vertically positioned telescope 17, the plumbing mirror 22 is removed from the cup. This is simply done by lifting the mirror out of the cup. The cup 21 then forms or constitutes a very precisely located mount for receiving a target, for example, to be used in the subsequent optical tooling operations. The body of such a target, not shown, may resemble or be substantially identical with the hemi-spherical body 37 of the mirror 22.

It should be understood that the foregoing description of use of the plumbing mirror of the invention is merely exemplary, it being apparent the mirror may be employed in various ways in connection with widely differing procedures. The upper film or layer of oil 52 may be removed or poured from the mirror following use and when the mirror is again put into operation the upper liquid film or layer is replaced as above described.

Having described only a typical form of the invention I do not wish to be limited to the specific details herein set forth, but wish to reserve to myself any variations or modifications that may appear to those skilled in the art and fall within the scope of the following claims.

I claim:

1. A plumbing mirror comprising a body having a socket in its upper end, a pool of light reflecting liquid occupying the bottom of the socket, a transparent cover spaced between the pool and the upper end of the socket, a layer of transparent liquid in the socket occupying the space between the under side of the cover and the pool, and a layer of transparent liquid in the socket on the upper surface of the cover, the liquid of said layers having substantially the same refractive index, the cover and the two liquid layers having substantially different indices of refraction, the reflecting liquid pool and the liquid layers having substantially different indices of refraction.

2. A plumbing mirror comprising a body having a socket extending generally vertically into its upper end and a well of reduced diameter in the bottom of the socket, a pool of mercury in the well, the upper face of the pool forming a light reflecting surface, a generally horizontal transparent cover in the socket spaced above the reflecting surface, a body of transparent liquid in the space between the under side of the cover and said reflecting surface, expansible and contractible means in communication with the well for accommodating thermal expansion and contraction of the pool and said body, and a body of transparent liquid on the upper surface of the cover, said liquid bodies having substantially the same refractive index, the cover and the liquid bodies having substantially different indices of refraction, the reflecting liquid pool and the liquid bodies having substantially different indices of refraction.

3. A plumbing mirror comprising a body having a socket extending generally vertically into its upper end and a well of reduced diameter in the bottom of the socket, a pool of mercury in the well, the upper face of the pool forming a light reflecting surface, a generally horizontal transparent cover in the socket spaced above the reflecting surface, a central optical target on a face of the cover, a body of transparent liquid in the space between the under side of the cover and said reflecting surface, and a body of transparent liquid on the upper surface of the cover, said liquid bodies having substantially the same refractive index, the cover and the liquid bodies having substantially different indices of refraction, the reflecting liquid pool and the liquid bodies having substantially different indices of refraction.

4. A plumbing mirror comprising a body having a spherically curved lower surface and having a socket in its upper side, a transparent cover in the socket spaced from the bottom thereof, a target on the cover substantially coincident with the axis of curvature of said spherically curved surface, a pool of mercury in the bottom of the socket spaced below the cover, the upper face of the pool constituting a reflective surface, a layer of transparent liquid in the space between said surface and the under side of the cover, and a layer of transparent liquid on the upper surface of the cover, the two layers having the same refractive characteristics, the cover and the two liquid layers having substantially different indices of refraction, the reflecting liquid pool and the liquid layers having substantially different indices of refraction.

5. Plumbing mirror means comprising a mount having an annular conical recess in its top, a body having a spherically curved lower surface movably seated in said recess and having a vertical opening in its upper end, a pool of light reflecting liquid in the bottom of the opening, the upper surface of the pool forming a reflector, a transparent cover in the opening spaced above the pool, a layer of transparent liquid in the opening between the pool of light reflecting liquid and the under side of the cover, and a layer of transparent liquid on the upper surface of the cover, said layers having the same refractive characteristics to form optical wedges of the same but opposite refraction ability when the pool is not truly level, the cover and the two liquid layers having substantially different indices of refraction, the reflecting liquid pool and the liquid layers having substantially different indices of refraction.

6. Plumbing mirror means comprising a mount having an annular conical recess in its top, a body having a spherically curved lower surface movably seated in said recess and having a vertical opening in its upper end, a pool of mercury in the bottom of the opening, the upper surface of the pool forming a reflector, a transparent cover in the opening spaced above the pool, a target on the cover coincident with the axis of curvature of said spherically curved surface, a layer of transparent liquid in the opening between the pool of mercury and the under side of the cover, and a layer of transparent liquid on the upper surface of the cover, said layers having the same refractive characteristics to form optical wedges of the same but opposite refraction ability when the pool is not truly level, the cover and the two liquid layers having substantially different indices of refraction, the reflecting liquid pool and the liquid layers having substantially different indices of refraction.

7. Plumbing mirror means comprising a mount comprising a vertically movable stem, having an annular conical recess in its top, a body having a spherically curved lower surface movably seated in said recess and having a vertical opening, the upper surface of the pool forming a reflector, a transparent cover in the opening spaced above the pool, a layer of transparent liquid in the opening between the pool of mercury and the under side of the cover, and a layer of transparent liquid on the upper surface of the cover, said layers having the same refractive characteristics to form optical wedges of the same but opposite refraction ability when the pool is not truly level, the cover and the two liquid layers having substantially different indices of refraction, the reflecting liquid pool and the liquid layers having substantially different indices of refraction.

References Cited in the file of this patent

UNITED STATES PATENTS 2,432,875   Flint ------------------ Dec. 16, 1947

FOREIGN PATENTS 15,079   Great Britain ------------------ 1914